United States Patent [19]

Foster

[11] Patent Number: 4,613,479
[45] Date of Patent: Sep. 23, 1986

[54] WATER REACTOR FUEL CLADDING

[75] Inventor: John P. Foster, Monroeville, Pa.

[73] Assignee: Westinghouse Electric Corp., Pittsburgh, Pa.

[21] Appl. No.: 589,296

[22] Filed: Mar. 14, 1984

[51] Int. Cl.⁴ .............................................. G21C 3/00
[52] U.S. Cl. .................................. 376/416; 376/414; 376/900
[58] Field of Search ............... 376/416, 415, 418, 414, 376/421, 900, 902; 75/126 C; 148/37, 36

[56] References Cited

U.S. PATENT DOCUMENTS

| | | | |
|---|---|---|---|
| 3,230,150 | 1/1966 | Martin | 376/416 |
| 3,354,043 | 11/1967 | Boettcher | 376/416 |
| 3,969,186 | 7/1976 | Thompson | 376/418 |
| 3,988,075 | 10/1976 | Penrose | 376/418 |
| 4,049,431 | 9/1977 | Hazel | 376/900 |
| 4,049,432 | 9/1977 | Hazel | 75/128 F |
| 4,530,719 | 7/1985 | Johnson | 376/900 |

Primary Examiner—Donald P. Walsh
Attorney, Agent, or Firm—John J. Prizzi

[57] ABSTRACT

Described herein is a water reactor composite nuclear fuel rod cladding tube which includes two concentric metallic layers metallurgically bonded to each other. The outer layer is composed of a conventional zirconium base alloy having high strength and excellent aqueous corrosion resistance. The inner layer is composed of: a low oxygen, BCC crystal structure niobium base material, containing less than about 59 w/o zirconium; or a ferritic stainless steel. This inner layer material is characterized by the ability to prevent the propagation of cracks initiated during reactor operation due to pellet-cladding interaction.

10 Claims, 1 Drawing Figure

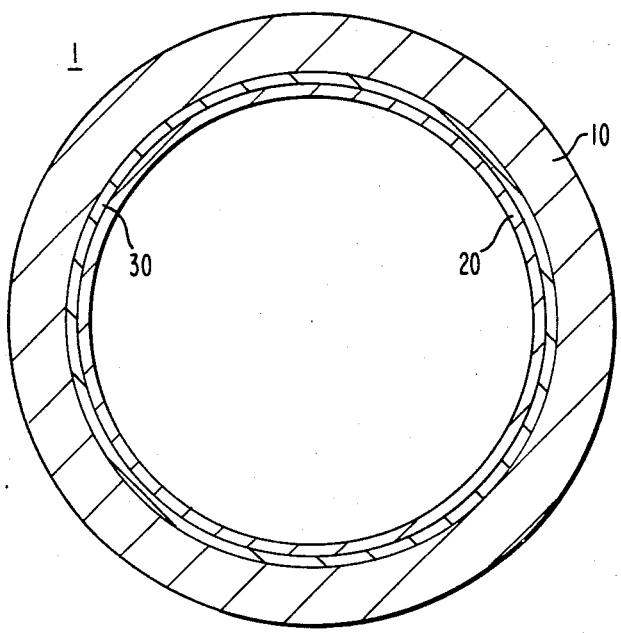

WATER REACTOR FUEL CLADDING

BACKGROUND OF THE INVENTION

The present invention pertains to the fields of BCC (body centered cubic) crystal structure metals and alloys and their use in water reactor fuel rod cladding. It is especially concerned with niobium and niobium base alloys, and ferritic stainless steels having properties which minimize the adverse effects of pellet-clad interaction (PCI) in light water reactor fuel elements.

The use of cladding tubes made entirely of a high zirconium alloy has been the practice in the water reactor industry. Examples of common alloys used are Zircaloy-2, Zircaloy-4 and zirconium-2.5 w/o niobium. These alloys were selected based on their nuclear properties, mechanical properties and high-temperature aqueouscorrosion resistance.

The history of the development of Zircaloy-2 and 4, and the abandonment of Zircaloy-1 and 3 is summarized in: Stanley Kass, "The Development of the Zircaloys," published in ASTM Special Technical Publication No. 368 (1964) pp. 3–27. This article is hereby incorporated by reference. Also of interest with respect to Zircaloy development are U.S. Pat. Nos. 2,772,964; 3,097,094; and 3,148,055.

Most commercial chemistry specifications for Zircaloy-2 and 4, and zirconium 2.5 w/o niobium, conform essentially with the requirements published in ASTM B350-80, (for alloy UNS No. R60802, R60804 and R60901, respectively) for example. In addition to these requirements, the oxygen content for the Zircaloy alloys is required to be between 900 to 1600 ppm but typically is about 1200±200 ppm.

It has been a common practice to manufacture Zircaloy cladding tubes by a fabrication process involving: hot working an ingot to an intermediate size billet; beta solution treating the billet or log; machining a hollow; high temperature alpha extruding the hollow billet to a hollow cylindrical extrusion; and then reducing the extrusion to substantially final size cladding through a number of cold pilger reduction passes, having an alpha recrystallization anneal prior to each pass. The cold worked, substantially final size cladding is then final annealed. This final anneal may be a stress relief anneal, partial recrystallization anneal or full recrystallization anneal. The type of final anneal provided, is selected based on the designer's specification for the mechanical properties of the fuel cladding.

One problem that has occurred in the use of fuel rods utilizing the aforementioned cladding has been the observation of cracks emanating from the interior surface of the cladding which is placed under additional stress by contact with a fractured, thermally expanding oxide fuel pellet. These cracks sometimes propagate through the wall thickness of the cladding destroying the integrity of the fuel rod and thereby allowing coolant into the rod and radioactive fission products to contaminate primary coolant circulating through the reactor core. This cracking phenomena, is generally believed to be caused by the interaction of irradiation hardening, mechanical stress and fission products, producing an environment conducive to crack initiation and propagation in zirconium alloys.

Niobium foils have been proposed for use as an independent, or free standing, liner inside of a Zircaloy cladding tube (U.S. Pat. Nos. 3,925,151 and 3,969,186). Vapor deposition of a thin niobium coating on the inside surface of Zircaloy cladding tubes has also been proposed (U.S. Pat. No. 3,969,186). In addition, the use of niobium as a thin, buried layer, bonded to, and located between two concentric layers of Zircaloy, or an inner layer of zirconium and an outer layer of Zircaloy has also been proposed (U.S. Pat. No. 4,045,288).

Other efforts to inhibit PCI related crack propagation have involved zircaloy fuel cladding tubes having a zirconium layer autogeneously bonded to their inside surface (U.S. Pat. Nos. 4,372,817; 4,200,492 and 4,390,497).

The present inventor has now proposed the following alloy barrier fuel cladding design as an improvement over the aforementioned designs.

It is submitted that wrought niobium, and wrought zirconium-niobium base alloys, will be particularly effective as a barrier to the propagation of PCI related cracks when they are metallurgically bonded in a layer of at least 0.003 inches in thickness to the inside surface of water reactor fuel cladding tubes composed of conventional reactor grade zirconium base alloys. The niobium base materials in accordance with the present invention contain up to about 59 w/o zirconium, up to about 0.25 w/o tantalum, up to about 300 ppm of oxygen, with the balance being niobium with incidental impurities. Within this broad composition range, there are three classes of materials as shown in Table I.

TABLE I

|    | A | B | C |
|----|---|---|---|
| O  | <100 ppm | <200 | <300 |
| Ta | <2500 ppm | <2000 | <1500 |
| Zr | <200 ppm | 0.02–13 w/o | 13–59 w/o |
| Nb | remainder with incidental impurities | remainder with incidental impurities | remainder with incidental impurities |

Class A materials are essentially pure, low oxygen niobium. Class B materials are low oxygen, zirconium-niobium base alloys having a stable fully beta niobium phase microstructure. Class C materials are low oxygen, zirconium-niobium base alloys having a metastable fully beta phase microstructure.

In an alternative embodiment of the present invention a layer of a ferritic stainless steel may be substituted for the niobium base layer previously described.

The foregoing and other embodiments and advantages will become more apparent upon review of the drawing in conjunction with the detailed description of the invention which follows.

BRIEF DESCRIPTION OF THE DRAWING

The FIGURE shows a cross section through an embodiment of tubular fuel element cladding in accordance with the present invention.

DETAILED DESCRIPTION OF THE INVENTION

Shown in the FIGURE is a transverse cross section through an embodiment of a nuclear fuel element cladding tube 1 in accordance with the present invention. As can be clearly seen in FIG. 1 the cladding tube 1 is made of concentric layers of materials. Each layer is continuously metallurgically bonded to the layer radially adjacent to it. The outermost layer 10 is composed of a zirconium base alloy selected for its excellent resistance to corrosion caused by exposure to high temperature and pressure aqueous environments. Commercial zirconium alloys meeting these requirements, and which are preferred for use in the present invention, are reactor grade Zircaloy-2, Zircaloy-4 and zirconium-2.5 w/o niobium alloys. The alloy used in the innermost layer 20 may of course differ from the alloy used in the outermost layer 10. The intermediate, or middle, layer 30, is made of niobium or a niobium alloy in accordance with the present invention. Layer 30 is preferably essentially pure, low oxygen niobium which has excellent resistance to neutron irradiation hardening and PCI crack propagation in water reactor operating conditions.

The innermost layer 20 is a sacrificial layer used to protect the niobium in layer 30 from damage during fabrication of the tube. Innermost layer 20 is preferably Zircaloy-2, Zircaloy-4, a zirconium 1–3 w/o niobium alloy, or zirconium (containing less than about 800 ppm oxygen). While this innermost layer 20 may be completely removed at the completion of fabrication, preferably it is left in a layer of about 0.5 to 2.0 mils thick in the final size tube to absorb high energy fission fragments during reactor operation. Most preferably, innermost layer 20 has a wall thickness of about 0.5 to 1.0 mils.

The layer 30, as already noted, is composed of one of the three classes of niobium materials in accordance with the present invention. While most preferably low oxygen, essentially pure niobium is utilized, the class B and C materials, though less preferred may be substituted. These zirconium niobium materials are believed to be resistant to PCI crack propagation as long as they retain their BCC (body centered cubic) fully beta phase microstructure. The zirconium-niobium equilibrium phase diagram shown and described at pp. 164–166 of D. L. Douglas, "The Metallurgy of Zirconium", Supplement 1971, published by the International Atomic Energy Agency, is hereby incorporated by reference. This phase diagram shows that the group B alloys, containing about 0.02 to 13 wt.% zirconium, will have a stable, fully beta phase microstructure. This equilibrium diagram, however, indicates that the group C alloys, containing about 13 to 59 wt.% zirconium, should have a microstructure containing both niobium rich beta phase and zirconium rich alpha phase. Alpha phase has a close packed hexagonal structure. The present inventor submits that if a group C alloy is quenched from a beta phase temperature above the miscibility gap, that the formation of alpha zirconium will be suppressed and the resulting microstructure will consist essentially of a metastable niobium rich beta phase having a BCC crystal structure. It is further submitted that this niobium rich beta phase will not decompose for a period of at least about 3 years in the temperature range of 300° to 400° C. This indicates that an alloy C type liner should retain its fully BCC structure throughout its PWR or BWR in reactor lifetime. Reducing the zirconium content will increase the stability of the metastable beta phase. It is therefore preferred that the group C alloys have a zirconium content which places them on the niobium rich side of the miscibility gap temperature peak shown on the aforementioned phase diagram; i.e., the zirconium content is preferably less than about 40 w/o.

In a preferred embodiment of the present invention, the essentially pure, low oxygen, niobium forming layer 30 must have a thickness of at least three mils in the final size cladding in order to fulfill its function as a barrier to PCI related crack propagation through the in reactor lifetime of the fuel rod. While the oxygen content of the niobium starting material is less than 200 ppm, oxygen is diffusing into the layer 30 from outer layer 10 and inner layer 20 during both fabrication of the composite tube, as well as throughout its in reactor lifetime. Increasing the oxygen content of the niobium will have a significant impact on its ability to arrest PCI related cracks. Therefore at least a 3 mil thickness of Nb is needed, in order to assure that near the end of the fuel rod in reactor lifetime that there is at least a 0.5 to 1.0 mil layer of niobium which is relatively uncontaminated by oxygen and still effective as a barrier to crack propagation. Preferably, the thickness of the niobium layer 30 is between 3 and 5 mils.

The overall wall thickness of the composite cladding tube 1 is about 22 to 34 mils. The outer layer 10 preferably forms at least about 60% of the overall wall thickness.

The cladding tube in accordance with the present invention may be fabricated, for example, by the following preferred methods:

Tubular Zircaloy starting components for the inner and outer layers are conventionally fabricated from ingots meeting the requirements of ASTM B350-80 for grade R60802 or R60804 and having an oxygen content between 900 and 1600 ppm. These Zircaloy tubular starting components may have a cold worked, hot worked, or beta quenched microstructure.

The niobium tubular starting component for the intermediate layer has a cold worked, hot worked, or beta annealed microstructure. The niobium forming this component contains less than about 200 ppm, and more preferably less than 100 ppm of oxygen.

An ingot of low oxygen, essentially pure niobium may be formed by electron beam melting or electron beam zone refining. The chemistry of a niobium ingot meeting the requirements of the present invention is shown below in Table II.

TABLE II

| Element | Ingot Chemistry Analysis in PPM | |
|---|---|---|
| | Top | Bottom |
| C | <30 | <30 |
| O | <50 | <50 |
| N | 16 | 42 |
| Ta | 1570 | 740 |
| W | <90 | <90 |
| Zr | <100 | <100 |
| Nb | Essentially the Balance | |

The niobium ingot is then worked by conventional techniques to substantially the final size required for the tubular starting component.

The inside diameter and outside diameter of intermediate layer starting component, as well as the outside diameter surface of innermost layer starting component and inner diameter surface of outermost layer starting component are then machined to size, such that the clearance between radially adjacent components, when nested inside of each other is minimized. After machining, the components are cleaned to remove, as nearly as possible, all surface contamination from the surfaces to be bonded. After cleaning, the components are preferably handled under clean room conditions until they are welded together. Recontamination of the surfaces to be bonded is thereby minimized. The components are then nested inside of each other, and the annulus formed at the interface of adjacent components is vacuum electron beam welded shut, such that a vacuum is maintained in the two annulii after welding both ends of the nested components.

At this stage, the unbonded tubeshell assembly is ready to be processed according to the known extrusion, cold pilgering and annealing processes utilized to fabricate cladding tubes made completely of Zircaloy. Conventional Zircaloy lubricants, cleaning, straightening, and surface finishing techniques may be used in conjunction with any of the processes, both conventional and new, described in copending applications Ser. Nos. 343,788 and 343,787 filed on Jan. 29, 1982, which are hereby incorporated by reference. All of the foregoing fabrication processes will result in complete and continuous metallurgical bonding of the three layers, except for minor, insignificant areas of unavoidable bond-line discontinuities.

Surface beta treatment, either by laser, or induction heating, as described in U.S. patent application Ser. No. 343,788 filed on Jan. 29, 1982 while not required to practice the present invention is clearly preferred. When used, such treatment would be performed either between the next to last and last cold pilgering passes or just prior to the next to last cold pilger pass. In either case it is preferred that the tube have had an intermediate anneal as well as being straightened, if necessary, prior to surface beta treatment. After surface beta treatment all intermediate, as well as the final anneals, should be performed below 600° C., and more preferably below 550° C. Most preferably the final anneal is performed below about 500° C. These low temperature anneals are used to preserve the enhanced corrosion resistance imparted to the innermost and outermost layers by the beta surface treatment.

While the surface beta treatment produces a Widmanstätten microstructure in only about the outer 10 to 40% of the wall thickness of the as surface treated intermediate size tube, it is to be understood that the enhanced aqueous corrosion resistance produced by such treatment is not confined to that area but preferably extends throughout the outermost layer, as well as the innermost layer and is retained after cold pilgering and annealing. In the final size fuel cladding, both the inside diameter surface and the outside diameter surface are characterized by a substantially black continuous and lustrous oxide film after 24 hours exposure in a 500° C., 1500 psi steam test. Surface beta treatment is believed to have no effect on the aqueous corrosion resistance of the substantially pure niobium in the intermediate layer.

Whether or not surface beta treatment has been used, the final anneal is preferably a vacuum anneal, at about 870°–900° F. for about 1 to 8 hours at temperature. Such an anneal would produce a stress relieved cold worked microstructure in the Zircaloy outermost and innermost layers. After the final anneal, conventional Zircaloy tube cleaning, straightening, final sizing and finishing steps are performed.

It is now clearly evident that the present composite cladding design is one in which standard fabrication techniques may be used without fear of damaging the niobium intermediate layer. It is also evident that since the niobium intermediate layer is protected during fabrication from surface defects and from nonuniform material removal during the cleaning steps (which include pickling) that the intermediate layer will be essentially free of microfissures, embedded surface particles and will have an extremely uniform wall thickness (i.e. ±0.2 mils or better). It is also readily evident that the loss of niobium due to cleaning operations is minimized since the niobium intermediate layer is covered throughout fabrication, beginning at the coextrusion stage of manufacture.

The tubing in accordance with the present invention is preferably used in the BWR fuel element design disclosed in copending application Ser. No. 589,300 filed on 3-14-84, in place of the lined cladding design taught therein. Copending application Ser. No. 589,300 filing date 3-14-84 is hereby incorporated by reference.

It should be understood that the chemistry specifications in accordance with the present invention may be met by performing analyses at the ingot stage of manufacture for all alloying elements and impurities, and subsequently near the coextrusion stage of manufacture for the interstitial impurities, (e.g. oxygen and nitrogen). Chemical analysis of the material in the final size cladding is not required, to met the chemistry requirements of the appended claims.

As already noted ferritic (i.e. BCC crystal structure) stainless steels may be substituted for the niobium base layer in the cladding tube in accordance with the present invention. Alloys that are specifically contemplated are: HT-9 produced by Sandvik AB of Sandviken, Sweden; and the D51 through D59 (including D57B alloys) described in U.S. Pat. Nos. 4,049,431 and 4,049,432, and in copending patent application Ser. No. 364,050 filed on Mar. 31, 1982, now U.S. Pat. No. 4,435,231. The two foregoing patents, as well as the patent application, are hereby incorporated by reference. HT-9 is a 12 wt.% Cr-1 wt.% Mo, ferritic stainless alloy.

Other embodiments of the present invention will be apparent to those skilled in the art from a consideration of this specification or practice of the invention disclosed herein. It is intended that the specification and examples be considered as illustrative only, with the true scope and spirit of the invention being indicated by the following claims.

I claim:

1. A nuclear fuel element cladding tube comprising: concentric tubular layers including a wrought niobium base material layer inside of an outermost layer;

said outermost layer, metallurgically bonded to said wrought niobium base material layer by coextrusion;

said outermost layer composed of a zirconium base alloy characterized by excellent resistance to corrosion caused by exposure to high temperature and pressure aqueous environments;

said wrought niobium base material layer consisting essentially of up to about 59 w/o zirconium, up to about 0.25 w/o tantalum, up to about 300 ppm of oxygen and the balance being essentially niobium;

and said wrought niobium base material layer having a wall thickness of at least 3 mils and characterized by improved resistance to crack propagation under reactor operating conditions compared to said zirconium alloy.

2. The nuclear fuel element cladding tube according to claim 1 wherein said wrought niobium base material layer has a wall thickness of 3 to 5 mils.

3. The nuclear fuel element cladding tube according to claim 1 wherein said zirconium alloy is selected from the group consisting of Zircaloy-2, Zircaloy-4 and zirconium about 1 to 3 w/o niobium alloys.

4. The nuclear fuel element cladding tube according to claim 1 wherein the oxygen content of said niobium base material is limited to less than about 100 ppm.

5. The nuclear fuel element cladding tube according to claim 1 wherein said niobium base material contains about 0.02 to 13 w/o zirconium and less than about 200 ppm of oxygen.

6. The nuclear fuel element cladding tube according to claim 1 wherein said niobium base material contains less than about 200 ppm zirconium and less than about 100 ppm of oxygen.

7. The nuclear fuel element cladding tube according to claim 1 wherein said niobium base material contains less than about 40 w/o zirconium.

8. The nuclear fuel element cladding tube according to claim 1 further comprising: an innermost concentric tubular layer having a wall thickness of about 0.5 to 2. mils; said innermost layer metallurgically bonded to said wrought niobium base material layer; and wherein said innermost layer is composed of a zirconium base material selected from the group consisting of Zircaloy-2, Zircaloy-4, Zirconium 1-3 w/o niobium, and zirconium.

9. A nuclear fuel element cladding tube comprising: concentric tubular layers including an inner, ferritic stainless steel layer and outer, zirconium base layer;
said zirconium base layer, metallurgically bonded to said ferritic stainless steel inner, layer by coextrusion;
said zirconium base layer composed of a zirconium base alloy characterized by excellent resistance to corrosion caused by exposure to high temperature and pressure aqueous environments;
and said inner layer having a wall thickness of at least 3 mils and characterized by improved resistance to crack propagation under reactor operating conditions compared to said zirconium alloy.

10. A nuclear fuel element cladding tube according to claim 9, wherein said ferritic stainless steel is selected from the group of alloys consisting of HT-9, D51, D52, D53, D54, D55, D56, D57, D57B, D58 and D59.

* * * * *